United States Patent [19]

Johnson et al.

[11] Patent Number: 4,570,182

[45] Date of Patent: Feb. 11, 1986

[54] HALO GENERATOR FOR CRT DISPLAY SYMBOLS

[75] Inventors: Michael J. Johnson; Hugh C. Hilburn, both of Phoenix, Ariz.

[73] Assignee: Sperry Corporation, New York, N.Y.

[21] Appl. No.: 553,223

[22] Filed: Nov. 18, 1983

[51] Int. Cl.$^4$ .............................................. H04N 5/272

[52] U.S. Cl. ....................................... 358/183; 358/22

[58] Field of Search ............... 358/22, 183, 21 R, 152, 358/160, 171; 340/723, 728, 732, 733, 734

[56] References Cited

U.S. PATENT DOCUMENTS 3,878,327 4/1975 Uhler .................................. 358/183

4,354,186 10/1982 Groothuis .......................... 340/728

*Primary Examiner*—Tommy P. Chin

*Attorney, Agent, or Firm*—Howard P. Terry

[57] ABSTRACT

An apparatus for generating halos about CRT display symbols, to distinguish them from background video, reads, from an image memory, video Bit signals corresponding to a CRT picture element $P_{I,J}$, and the immediately surrounding CRT picture elements. A digital signal is generated therefrom representing a first Boolean Function. The intensity of the background illumination at $P_{I,J}$, is unaltered, in response to a digital signal of zero, and is diminished by one-half, in response to a digital signal of one.

22 Claims, 8 Drawing Figures

| | | |
|---|---|---|
| $P_{i-1,j+1}$ | $P_{i,j+1}$ | $P_{i+1,j+1}$ |
| $P_{i-1,j}$ | $P_{i,j}$ | $P_{i+1,j}$ |
| $P_{i-1,j-1}$ | $P_{i,j-1}$ | $P_{i+1,j-1}$ |

44
SHIFT REGISTER
53
52
50
51
DELAY
DELAY
DELAY
67
70
71
SHIFT REGISTER
58
51
55
56
DELAY
DELAY
DELAY
66
73
74
BOOLEAN PROCESSOR
SHIFT REGISTER
63
62
60
61
76
77
DELAY
DELAY

HALO GENERATOR FOR CRT DISPLAY SYMBOLS

"The U.S. Government has certain rights in this invention pursuant to Contract No. F3365-82-C-2038 awarded by the Department of the Air Force."

BACKGROUND OF THE INVENTION

1. Field of the Invention

The present invention relates generally to CRT displays, and more particularly to the generation of halos around symbols therein, to distinguish the symbols from video background.

2. Description of the Prior Art

Symbols are written on a CRT display which overlay background video. Referring to FIG. 1, which is a negative of an actual display, a symbol 20 is rendered less discernable by background video 21 which surrounds and borders the symbol 20. The obfuscating effect of the background video 21 upon the symbol 20 is particularly pronounced on the right of the CRT display where the symbol 20 appears to merge with the background video 21.

Thus, there is a need for an apparatus which precludes symbols on CRT displays from being confused with the background video.

SUMMARY OF THE INVENTION

The present invention entails an apparatus for generating halos about symbols in video displays to distinguish the symbols from video background. The apparatus comprises a video display having a matrix of picture elements $P_{X,Y}$, and means for illuminating the picture elements in response to applied signals. A means for generating coordinates, for providing signals representing the coordinates, and for synchronizing the illuminating means with the coordinates is coupled to the video display. A memory, having addresses corresponding to the picture elements, stores video bit signals $B_{X,Y}$. A means for reading, in response to a signal from the coordinate generating means representing a generated coordinate $I,J$, the addresses corresponding to the picture elements $P_{I-1,J-1}$, $P_{I,J-1}$, $P_{I+1,J-1}$, $P_{I-1,J}$, $P_{I,J}$, $P_{I+1,J}$, $P_{I-1,J+1}$, $P_{I,J+1}$ and $P_{I+1,J+1}$ is coupled to the memory and the coordinate generating means. Coupled to the address reading means is a means for generating a digital signal $$\left(\sum_{X=I-1,\,Y=J-1}^{I+1,\,J+1} B_{X,Y}\right)(\overline{B_{I,J}}).$$

The apparatus further comprises a means, coupled to the coordinate generating means, for generating, in response to a signal from the coordinate generating means representing the generated coordinate $I,J$, a video background signal for producing a predetermined intensity of illumination of the picture element $P_{I,J}$. A means is utilized for generating, in response to a zero digital signal and the video background signal, a first signal, and for generating, in response to a one digital signal and the video background signal, a second signal. The picture element $P_{I,J}$ is illuminated at a predetermined fraction of the predetermined intensity by the illuminating means of the video display, in response to the second signal; and, $P_{I,J}$ is illuminated at the predetermined intensity by the illuminating means, in response to the first signal.

A preferred embodiment of the present invention is utilized in conjunction with the present Assignee's invention, Ser. No. 553,224, entitled Apparatus for Expanding Illuminated Picture elements in CRT displays. The preferred embodiment is analogous to the apparatus described above, with the following distinctions. Each memory address is identified by an $X$ and a $Y$ binary coordinate, and video bit signals are stored only in addresses whose $X$ coordinate has a predetermined first binary digit, and whose $Y$ coordinate has a predetermined first binary digit. The video bit signals $B_{X,Y}$ read from the memory correspond to the picture elements $P_{I,J}$ $P_{I-1,J}$, $P_{I-1,J+1}$, $P_{I,J+1}$ and those immediately surrounding them, namely, $P_{I-2,J-1}$, $P_{I-1,J-1}$, $P_{I,J-1}$, $P_{I+1,J-1}$, $P_{I-2,J}$, $P_{I+1,J}$, $P_{I-2,J+1}$, $P_{I+1,J+1}$, $P_{I-2,J+2}$, $P_{I-1,J+2}$, $P_{I,J+2}$, and $P_{I+1,J+2}$. The digital signal generated is $$\left(\sum_{X=I-2,\,Y=J-1}^{I+1,\,J+2} B_{X,Y}\right)\left(\overline{\sum_{X=I-1,\,Y=J}^{I,\,J+1} B_{X,Y}}\right)$$

In preferred embodiments of the present invention the address reader comprises shift registers coupled to delays comprising shift registers or D type flip-flops. The predetermined fraction of illumination intensity referred to above is preferably one-half. That is, the intensity of the video background at the border of a symbol is preferably reduced by one-half. Such a reduction in intensity creates a halo around a symbol which is black in appearance, and distinguishes the symbol from background, but which does not induce flickering.

BRIEF DESCRIPTION OF THE DRAWINGS

Identical numerals in different Figures represent identical elements.

DESCRIPTION OF THE PREFERRED EMBODIMENTS

The present invention entails an apparatus for generating halos around symbols on CRT displays in order to distinguish the symbols from video background.

Figures 1, 2:
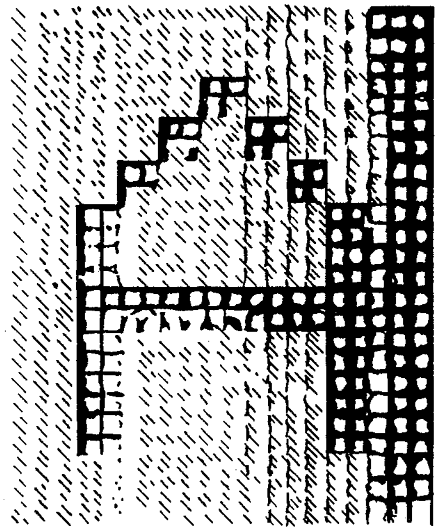
FIG. 1 is a schematic diagram illustrating confusion of a symbol with background in a CRT display.
FIG. 2 is a schematic diagram of the picture elements, in a preferred embodiment of the invention, whose memory address contents determine the status of video background at a picture element $P_{I,J}$.

A CRT display is coupled to an image memory. A picture element in the CRT display is illuminated as symbology if the corresponding address in the image memory contains a video bit signal of "1". The picture element is unilluminated as symbology if the corresponding address in the image memory contains a video bit signal of "0". The picture element with which the beam generator of the CRT display is currently aligned may be denoted $P_{I,J}$. The video bit signal in the address in the image memory corresponding to the currently aligned picture element $P_{I,J}$ may be denoted $B_{I,J}$. Referring to FIG. 2, when the beam generator of the CRT display is currently aligned with the picture element $P_{I,J}$, the surrounding picture elements $P_{I-1,J-1}$, $P_{I,J-1}$, $P_{I+1,J-1}$, $P_{I-1,J}$, $P_{I+1,J}$, $P_{I-1,J+1}$, $P_{I,J+1}$, and $P_{I+1,J+1}$, are considered. If the video bit signal $B_{I,J}$ is a "1" then $P_{I,J}$ is part of a symbol and background video at $P_{I,J}$ is not altered. The background at a picture element comprising an illuminated symbol may be unilluminated, in order to enhance the symbol's clarity. If the video bit signal $B_{I,J}$ in the address in memory corresponding to the picture element $P_{I,J}$ is a zero then $P_{I,J}$ is not illuminated as symbology, and therefore may be part of the border of a symbol. This is the case when any of the surrounding picture elements $P_{I-1,J-1}$, $P_{I,J-1}$, $P_{I+1,J-1}$, $P_{I-1,J}$, $P_{I+1,J}$, $P_{I-1,J+1}$, $P_{I,J+1}$ $P_{I+1,J+1}$ is illuminated. Accordingly, when $B_{I,J}$ is zero and any of the addresses in memory corresponding to the picture elements surrounding the presently aligned picture element $P_{I,J}$ contains a video bit signal 1, then $P_{I,J}$ borders an illuminated symbol. In this case, the intensity of the video background illumination at $P_{I,J}$ is diminished, in order to make the symbol more discernable.

The above procedure may be described mathematically. The dimming status, denoted DS, of the intensity of the video background illumination at the currently aligned picture element $P_{I,J}$ is either 0 or 1. A "0" indicates the intensity of the video background illumination at $P_{I,J}$ is to be unchanged; and, a "1" indicates the intensity of the video background illumination at $P_{I,J}$ is to be reduced. In conformance with the description above $$DS = \left( \sum_{X=I-1,Y=J-1}^{I+1,J+1} B_{X,Y} \right) (\overline{B_{I,J}})$$

The $B_{X,Y}$ addends are the video bit signals in the addresses corresponding to the nine picture elements in FIG. 2. The summation represents a Boolean "OR" operation. That is, the sum will be 1 when any one of the $B_{X,Y}$ is 1, and will be zero only when all of the $B_{X,Y}$ are zero. $B_{I,J}$, as before, is the video bit signal in the address corresponding to the picture element $P_{I,J}$. The bar above $B_{I,J}$ deonotes complement, wherein $\overline{1}=0$, and $\overline{0}=1$. The product represents a Boolean "AND" operation. That is, the product will be 1 only when both factors are 1, and will be zero otherwise. Accordingly, if $B_{I,J}$ is 1, indicating the $P_{I,J}$ is part of an illuminated symbol, then $\overline{B_{I,J}}=\overline{1}=0$, and $$\left( \sum_{X=I-1,Y=J-1}^{I+1,J+1} B_{X,Y} \right) (\overline{B_{I,J}}) = \left( \sum_{X=I-1,Y=J-1}^{I+1,J+1} B_{X,Y} \right) (\emptyset) = \emptyset = DS.$$

The zero value for DS indicates that the intensity of the video background illumination at the currently aligned picture element $P_{I,J}$ is to be unaltered, in conformance with the description above. If $B_{I,J}$ is 0, indicating that the picture element $P_{I,J}$ as symbology is unilluminated, and if any video bit signal is 1 in the addresses corresponding to the picture elements in FIG. 2 surrounding the picture element $P_{I,J}$, indicating that $P_{I,J}$ borders a symbol, then $\overline{B_{I,J}}=1$ and $$\left( \sum_{X=I-1,Y=J-1}^{I+1,J+1} B_{X,Y} \right) = 1,$$

and thus, DS=1. The 1 value for DS indicates that the intensity of the video background illumination at the picture element $P_{I,J}$ is to be reduced, in conformance with the description above. If $B_{I,J}$ is zero and all of the video bit signals of the addresses corresponding to the surrounding picture elements are zero, then picture element $P_{I,J}$ does not border a symbol, and the intensity of the video background illumination at $P_{I,J}$ is to be unchanged. The calculated DS for this situation is 0, which conforms to the description.

Thus, the dimming status, DS, of the intensity of the video background illumination at the currently aligned picture element $P_{I,J}$ may be expressed as $$DS = \left( \sum_{X=I-1,Y=J-1}^{I+1,J+1} B_{X,Y} \right) (\overline{B_{I,J}}).$$

Figure 3:
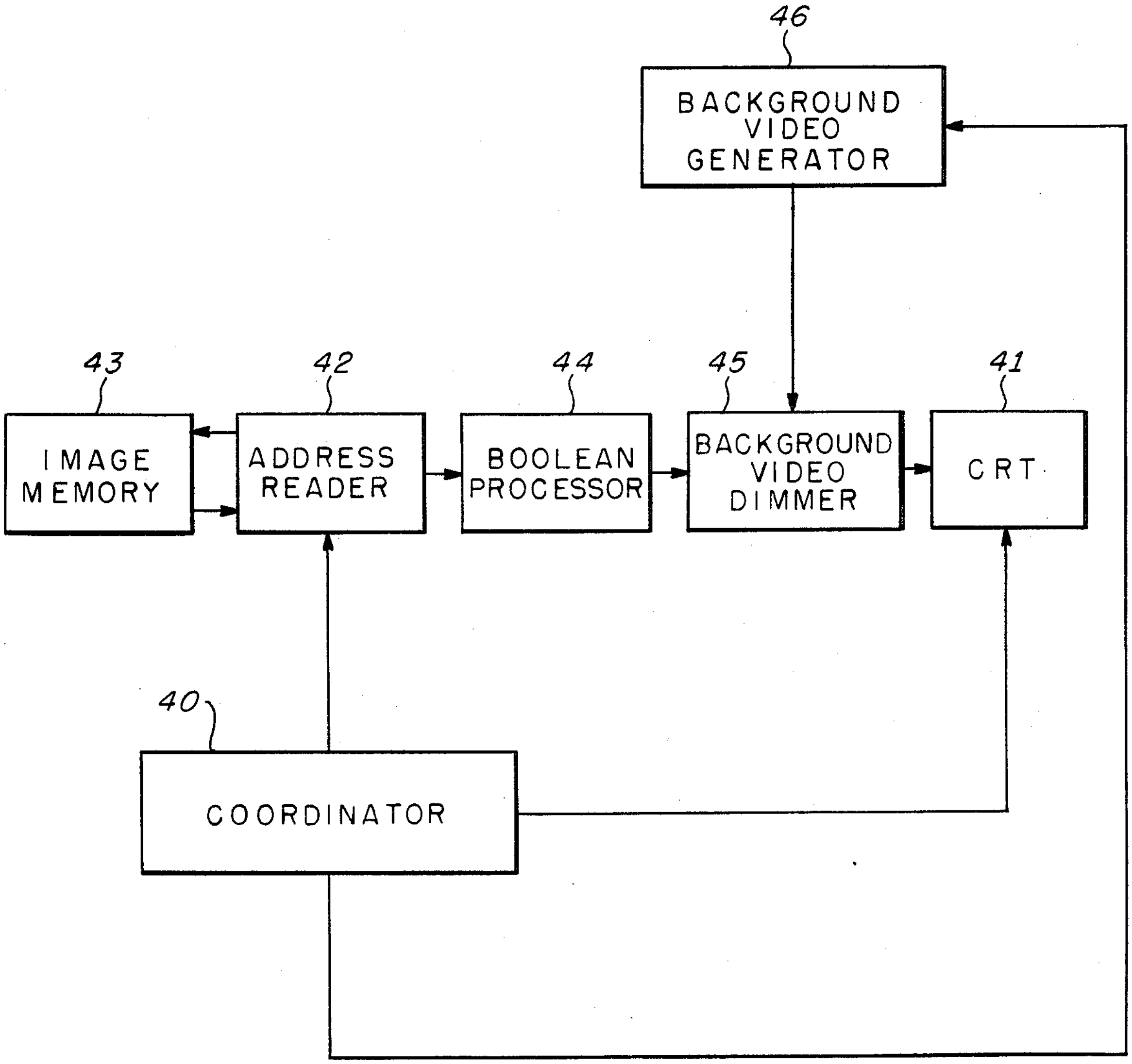
FIG. 3 is a block diagram of a preferred embodiment of the invention.

Referring to FIG. 3, the above expression may be implemented as follows:

A coordinator 40, coupled to a CRT display 41, generates coordinates, and aligns the beam generator of the CRT display with the picture elements corresponding to the generated coordinates. The coordinator 40 is also coupled to an address reader 42. The address reader 42 is coupled to an image memory 43. The address reader 42, in response to a signal from the coordinator 40 indicating the coordinate of the picture element with which the beam generator is currently aligned, reads from the image memory 43 the video bit signals in the nine addresses associated with the currently aligned picture element. That is, denoting, as before, the currently aligned picture element as $P_{I,J}$ the video bit signals $B_{I,J}$, $B_{I-1,J+1}$, $B_{I,J+1}$, $B_{I+1,J+1}$, $B_{I+1,J}$, $B_{I+1,J-1}$, $B_{I,J-1}$, $B_{I-1,J-1}$, and $B_{I-1,J}$ in the addresses of the image memory 43 corresponding, respectively, to the picture elements $P_{I,J}$ $P_{I-1,J+1}$, $P_{I,J+1}$ $P_{I+1,J+1}$, $P_{I+1,J}$, $P_{I+1,J-1}$, $P_{I,J-1}$, $P_{I-1,J-1}$, and $P_{I-1,J}$, are read from the image memory 43 by the address reader 42. These nine video bit signals are conveyed to a Boolean processor 44 which generates the dimming status of the video background at the currently aligned picture element $P_{I,J}$. That is, the Boolean processor 44 generates $$DS = \left( \sum_{X=I-1,Y=J-1}^{I+1,J+1} B_{X,Y} \right) (\overline{B_{I,J}}),$$

for field redundant symbology (CRT displays comprise 2 fields to make 1 frame equalling one full picture. In some systems the fields are redundant meaning the picture painted by 1 field is exactly replicated by the other field. In other systems the fields are not required to contain the same picture element information. In either system 1 field alternates in time with the other field creating interlaced horizontal lines from each field from top to bottom of the picture.)

A background video generator 46 is coupled to the coordinator 40. The background video generator 46 produces background video signals corresponding to the coordinates provided by the coordinator 40. Each background video signal is designed to produce a predetermined intensity of illumination in a corresponding picture element. A background video dimmer 45 receives, from the background video generator 46, a background video signal corresponding to the currently aligned picture element $P_{I,J}$. In response to a zero digital signal from the Boolean processor 44, the background video dimmer 45 applies the unaltered video background signal to the beam generator of the CRT display 41, illuminating $P_{I,J}$ accordingly. In response to a one digital signal from the Boolean processor 44, the background video dimmer 45 applies a signal to the beam generator of the CRT display 41 which engenders illumination of $P_{I,J}$ having an intensity which is a predetermined fraction of that which the video background signal was designed to produce. This predetermined fraction is preferably one-half. In this fashion, the video background bordering an illuminated symbol is dimmed, creating a distinguishing halo around the symbol.

Figure 4:
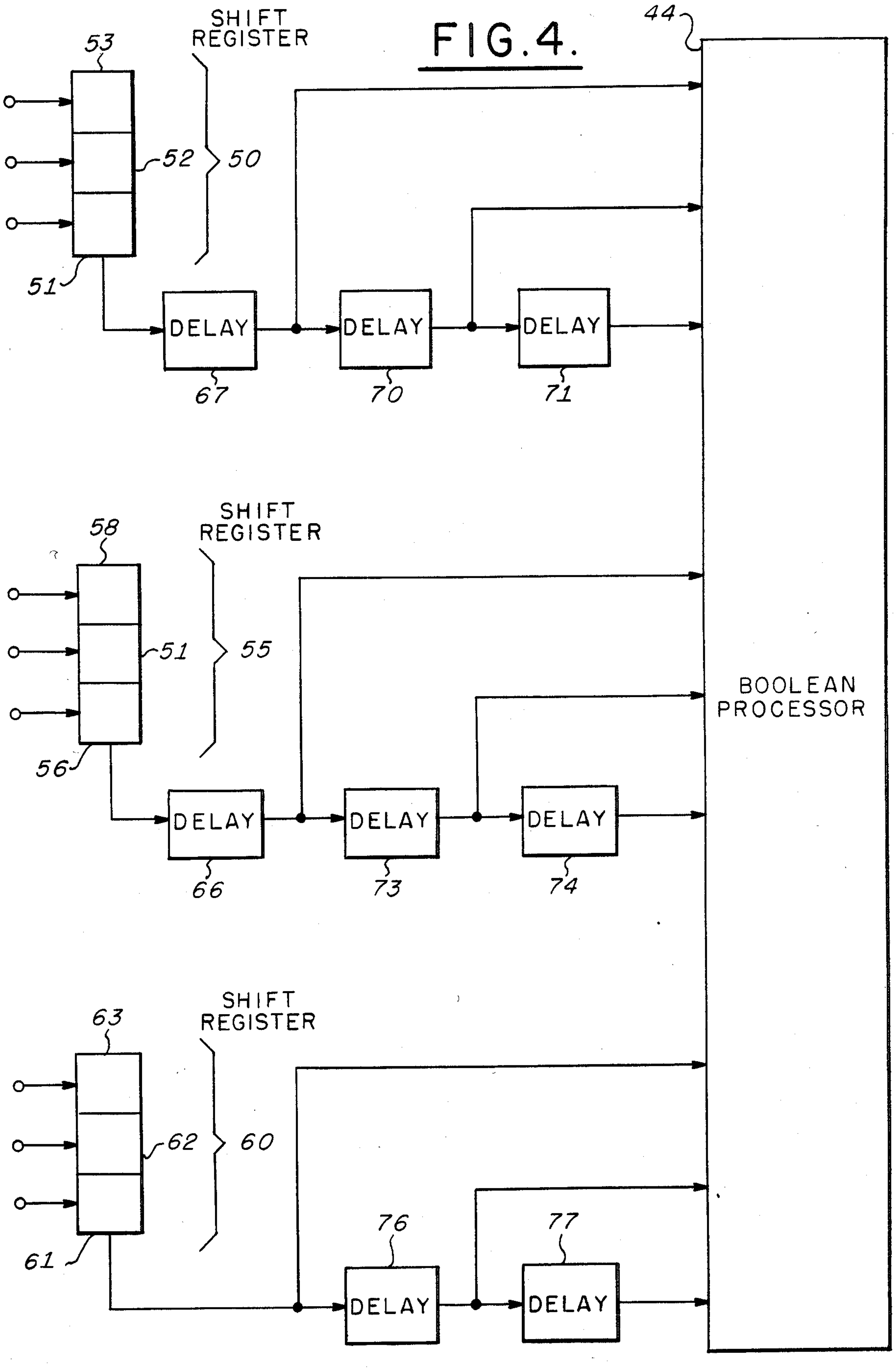
FIG. 4 is a block diagram of an address reader and a Boolean processor utilized in a preferred embodiment of the invention.

Referring to FIG. 4, in a preferred embodiment of the invention the address reader comprises shift registers and delays. A shift register 50 is loaded in parallel, with the video bit signal $B_{I-1,J-1}$ received by a compartment 51, the video bit signal $B_{I,J-1}$ received by a compartment 52 and the video bit signal $B_{I+1,J-1}$ received by a compartment 53. After a first delay, a shift register 55 is loaded in parallel, with the video bit signal $B_{I-1,J}$ received by a compartment 56, the video bit signal $B_{I,J}$ received by a compartment 57, and the video bit signal $B_{I+1,J}$ received by a compartment 58. After a second delay, a shift register 60 is loaded in parallel, with the video bit signal $B_{I-1,J+1}$ received by a compartment 61, the video bit signal $B_{I,J+1}$ received by a compartment 62, and the video bit signal $B_{I+1,J+1}$ received by a compartment 63. The shift register 50 serially outputs the contents of the compartments 51, 52, and 53. After the shift register 50 has begun to output, the shift register 55 serially outputs the contents of the compartments 56, 57, and 58. After the shift register 55 has begun to output, the shift register 60 serially outputs the contents of the compartments 61, 62, and 63. A delay 66 synchronizes the outputs of the shift register 55 with the outputs of the shift register 60. That is, the first output of the delay 66, $B_{I-1,J}$, coincides with the first output of the shift register 60, $B_{I-1,J+1}$; the second output of the delay 66, $B_{I,J}$, coincides with the second output of the shift register 60, $B_{I,J+1}$; and, the third output of the delay 66, $B_{I+1,J}$, coincides with the third output of the shift register 60, $B_{I+1,J+1}$. Similarly, a delay 67 synchronizes the outputs of the shift register 50 with the outputs of the shift register 55, and thereby also the outputs of the shift register 60. After action by the delays 66 and 67, video bit signals from the shift registers 50, 55 and 60 having the same X coordinate are synchronized in time. Each of the delays 66 and 67 preferably comprises a shift register. A delay 70 receives the first output of the delay 67, $B_{I-1,J-1}$. The delay 70 outputs the video bit signal $B_{I-1,J-1}$ in synchronism with the outputting of the video bit signal $B_{I,J-1}$ by the delay 67. The video bit signal $B_{I-1,J-1}$ is received by the delay 71, and the video bit signal $B_{I,J-1}$ is received by the delay 70. The delay 71 outputs $B_{I-1,J-1}$, and the delay 70 outputs $B_{I,J-1}$ in synchronism with the outputting of $B_{I+1,J-1}$ by the delay 67. In this fashion, the three video bit signals $B_{I-1,J-1}$, $B_{I,J-1}$, and $B_{I+1,J-1}$ are simultaneously available for conveying to the Boolean processor 44. The outputs of the delay 66 and the outputs of the shift register 60 are processed similarly by, respectively, delays 73 and 74, and delays 76 and 77 such that the video bit signals $B_{I-1,J}$, $B_{I,J}$, $B_{I+1,J}$, and the video bit signals $B_{I-1,J+1}$, $B_{I,J+1}$ and $B_{I+1,J+1}$ are all available simultaneously, in synchronism with the video bit signals $B_{I-1,J-1}$, $B_{I,J-1}$, $B_{I+1,J-1}$ for conveyance to the Boolean processor 44. Each of the delays 70, 71, 73, 74, 76, and 77 preferably comprises a standard D type flip-flop.

Figure 5:
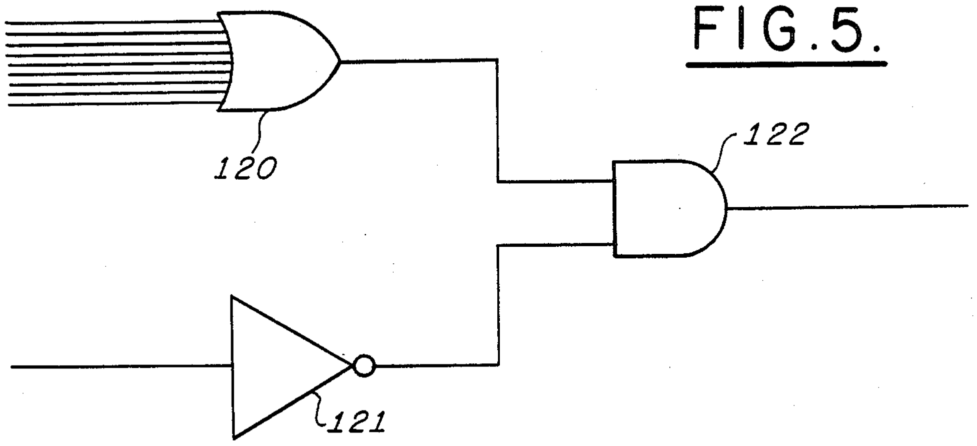
FIG. 5 is a schematic diagram of a Boolean processor utilized in a preferred embodiment of the invention.

Referring to FIG. 5, the Boolean processor 44 preferably comprises a nine input OR gate 120 for receiving the video bit signals $B_{I,J}$, $B_{I-1,J+1}$, $B_{I,J+1}$, $B_{I+1,J+1}$, $B_{I+1,J}$, $B_{I+1,J-1}$, $B_{I,J-1}$, $B_{I-1,J-1}$, and $B_{I-,J}$, and for generating the Boolean OR sum signal of these input signals. A NOT gate 121 receives the video bit signal $B_{I,J}$ and generates a $\overline{B_{I,J}}$ video bit signal. The output of the BOOLEAN OR gate 120 and the output of the NOT gate 121 are conveyed to an AND gate 122 which generates the required digital signal $$\left(\sum_{X=I-1,\ Y=J-1}^{I+1,\ J+1} B_{X,Y}\right)(\overline{B_{I,J}}).$$

Figure 6:
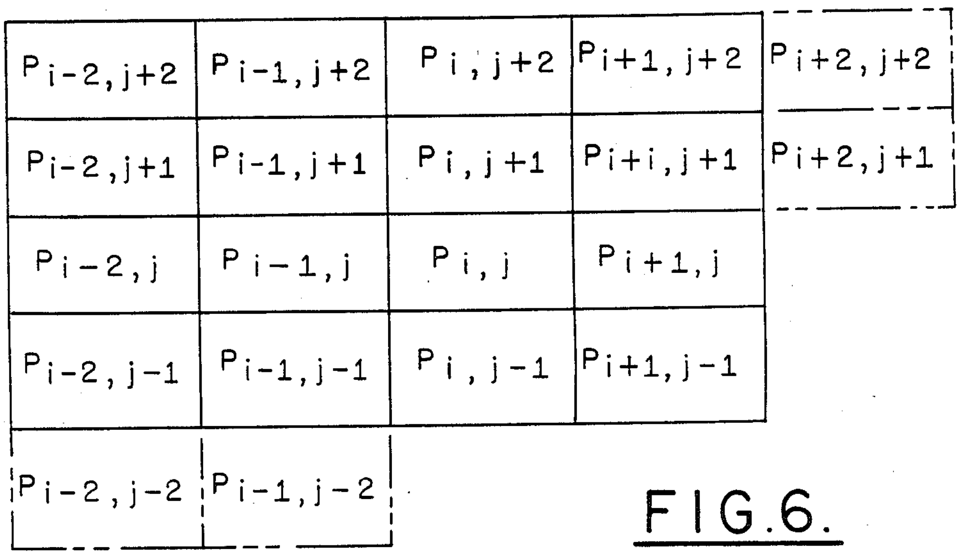
FIG. 6 is a schematic diagram utilized in describing, in a preferred embodiment of the invention, the circumstances in which the intensity of background illumination is reduced at a picture element $P_{I,J}$.

The present invention may be utilized with a second invention of the present assignee, Ser. No. 553,224, entitled Apparatus for Expanding Illuminated Picture Elements in CRT Displays, which is hereby incorporated by reference. In the second invention, each memory address is identified by an $X$ and a $Y$ binary coordinate, and video bit signals are stored only in addresses whose $X$ coordinate has a predetermined first binary digit, and whose $Y$ coordinate has a predetermined first binary digit. Each illuminated picture element is replicated three times. This is achieved, as explained in the description of the second invention, by illuminating the currently aligned picture element $P_{I,J}$ when there is a video bit signal of 1 in any of the addresses in the image memory corresponding to the picture elements $P_{I,J}$, $P_{I-1,J}$, $P_{I-1,J+1}$, and $P_{I,J+1}$. Accordingly, if any of the video bit signals $B_{I,J}$, $B_{I-1,J}$, $B_{I-1,J+1}$ or $B_{I,J+1}$ is 1, then $P_{I,J}$ is part of an illuminated symbol, and accordingly, the background video at $P_{I,J}$ is unaltered. If none of the video bit signals $B_{I,J}$, $B_{I-1,J}$, $B_{I-1,J+1}$ and $B_{I,J+1}$ is 1, then $P_{I,J}$ as symbology is unilluminated. If there is a video bit signal of 1 in any of the addresses in the image memory corresponding to the picture elements immediately surrounding the picture elements $P_{I,J}$, $P_{I-1,J}$, $P_{I-1,J+1}$, $P_{I,J+1}$, then $P_{I,J}$ borders a symbol, and the intensity of the background illumination at $P_{I,J}$ is reduced, to create a distinguishing halo around the symbol. That is, referring to FIG. 6, assuming that the video bit signals in the memory addresses corresponding to the picture elements $P_{I,J}$, $P_{I-1,J}$, $P_{I-1,J+1}$, $P_{I,J+1}$ are all zero, if there is a video bit signal of 1 in any of the memory addresses corresponding to the surrounding picture elements $P_{I-2,J+2}$, $P_{I-1,J+2}$, $P_{I,J+2}$, $P_{I+1,J+2}$, $P_{I+1,J+1}$, $P_{I+1,J}$, $P_{I+1,J-1}$, $P_{I,J-1}$, $P_{I-1,J-1}$, $P_{I-2,J-1}$, $P_{I-2,J}$, $P_{I-2,J+1}$ then the picture element $P_{I,J}$ borders a symbol. For example, if there is a 1 video bit signal in the memory address of $P_{I-2,J+2}$, then the second invention illuminates $P_{I-1,J+2}$, $P_{I-2,J+1}$ and $P_{I-1,J+1}$. Thus, $P_{I,J}$ borders the illuminated $P_{I-1,J+1}$. If there is a 1 video bit signal in the memory address of $P_{I+1,J+2}$, then the second invention illuminates $P_{I+2,J+2}$, $P_{I+2,J+1}$, and $P_{I+1,J+1}$. Thus $P_{I,J}$ borders on the illuminated $P_{I+1,J+1}$. If there is a 1 video bit signal in the memory address of $P_{I-2,J-1}$, then $P_{I-1,J-1}$, $P_{I-2,J-2}$, and $P_{I-1,J-2}$ are illuminated. Thus $P_{I,J}$ borders on the illuminated $P_{I-1,J-1}$. A 1 video bit signal in the memory address of any of the other surrounding picture elements similarly results in an illuminated picture element bordering on the picture elment $P_{I,J}$. The intensity of the background illumination at $P_{I,J}$ is, accordingly, reduced to generate a distinguishing halo for the illuminated symbol that $P_{I,J}$ borders.

Mathematically, the dimming status, DS, described above, of the video background at the currently aligned picture element $P_{I,J}$ may be expressed as $$DS = \left(\sum_{X=I-2,Y=J-1}^{I+1,J+2} B_{X,Y}\right)\left(\overline{\sum_{X=I-1,Y=J}^{I,J+1} B_{X,Y}}\right),$$

for non-field redundant symbology

The expression $$\sum_{X=I-1,Y=J}^{I,J+1}$$

$B_{X,Y}$ is the Boolean OR sum of the video bit signals in the memory addresses corresponding to the picture elements $P_{I,J}$ $P_{I-1,J}$, $P_{I-1,J+1}$, $P_{I,J+1}$. If any of these video bit signals is 1 then the sum is 1. The bar denotes complement. Accordingly, if this sum is 1, the complement is 0 and DS is zero, indicating that the intensity of the background illumination at $P_{I,J}$ is to be unaltered. This conforms to the situation wherein $P_{I,J}$ is illuminated as symbology since one of the video bit signals is 1 in the memory addresses corresponding to $P_{I,J}$ $P_{I-1,J}$, $P_{I-1,J+1}$, $P_{I,J+1}$; and, the background video at $P_{I,J}$ is thus left unchanged. If all the video bit signals in the memory addresses corresponding to the picture elements $P_{I,J}$ $P_{I-1,J}$, $P_{I-1,J+1}$, $P_{I,J+1}$ are zero, then $$\left(\sum_{X=I-1,Y=J}^{I,J+1} B_{X,Y}\right) = \emptyset, \text{ and } \left(\overline{\sum_{X=I-1,Y-J}^{I,J+1} B_{X,Y}}\right) = 1.$$

This corresponds to $P_{I,J}$ not being illuminated as symbology. If any of the video bit signals is 1 in the memory addresses corresponding to the surrounding picture elements $P_{I-2,J+2}$, $P_{I-1,J+2}$, $P_{I,J+2}$, $P_{I+1,J+2}$, $P_{I+1,J+1}$, $P_{I+1,J}$, $P_{I+1,J-1}$, $P_{I,J-1}$, $P_{I-1,J-1}$, $P_{I-2,J-1}$, $P_{I-2,J}$, and $P_{I-2,J+1}$ then $$\sum_{X=I-2,Y=J-1}^{I+1,J+2} B_{X,Y}$$

is 1, and DS=1, indicating that the intensity of the background illumination at $P_{I,J}$ is to be reduced, preferably, by one-half. This conforms to the situation wherein $P_{I,J}$ is not illuminated as symbology, but borders on an illuminated symbol, and thus, the video background at $P_{I,J}$ is darkened to generate a distinguishing halo around the symbol.

Thus, the dimming status, DS, of the video bckground at $P_{I,J}$ may be expressed as $$DS = \left(\sum_{X=I-2,Y=J-1}^{I+1,J+2} B_{X,Y}\right)\left(\overline{\sum_{X=1-1,Y=J}^{I=,J+1} B_{X,Y}}\right)$$

Referring to FIG. 3, the above expression may be implemented in a manner analogous to that of the previous dimming status expression. In this case, the address reader 42 reads the addresses in the image memory 43 corresponding to the sixteen central picture elements in FIG. 6. The Boolean processor 44 implements the relevant expression for DS above.

Figure 7:
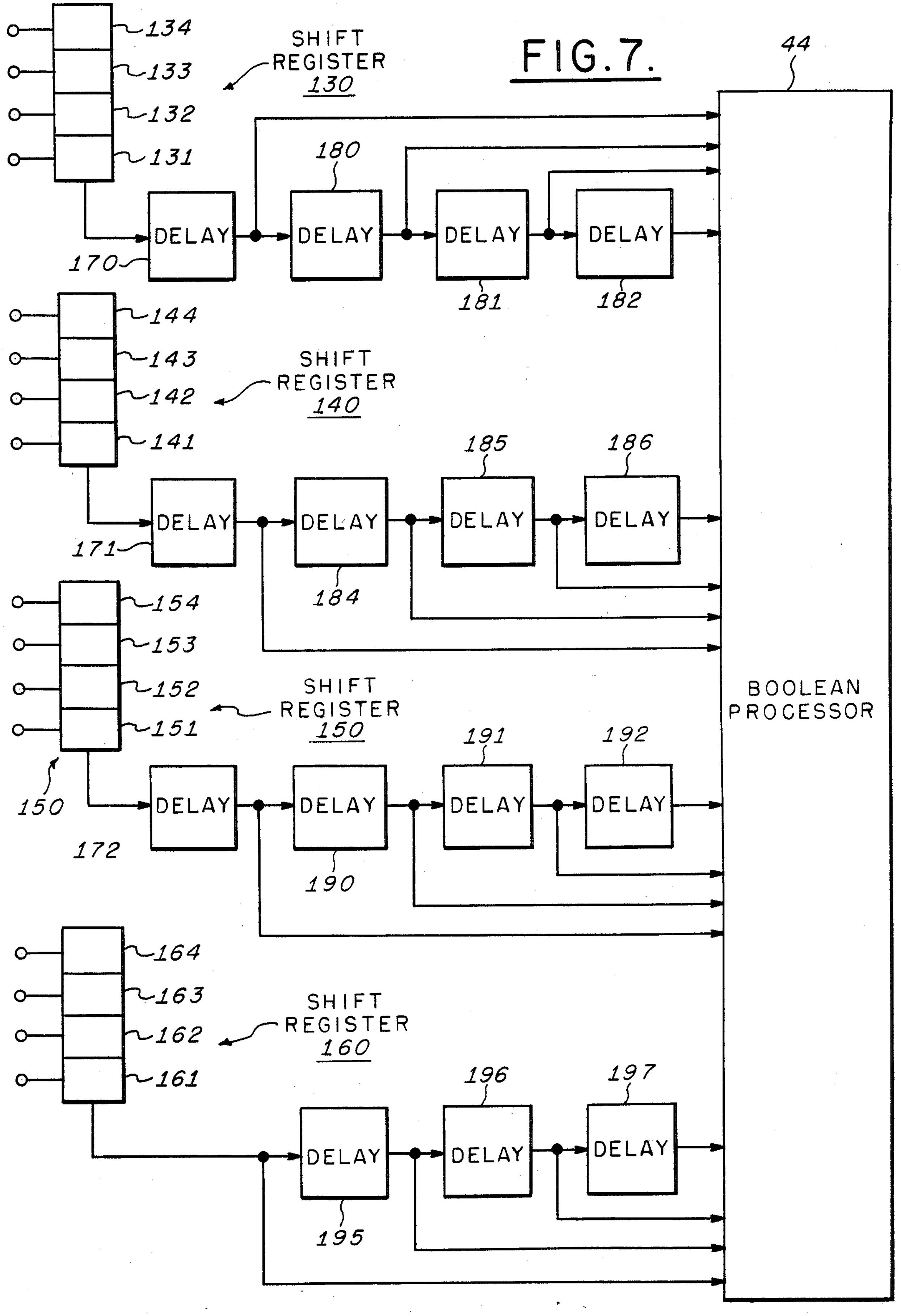
FIG. 7 is a block diagram of an address reader and a Boolean processor utilized in a preferred embodiment of the invention.

Referring to FIG. 7, the address reader 42 utilized with this preferred embodiment of the invention is analogous to that of FIG. 4.

A shift register 130, having four compartments, is loaded in parallel, with the video bit signals $B_{I-2,J-1}$, $B_{I-1,J-1}$, $B_{I,J-1}$ and $B_{I+1,J-1}$ received, respectively, by compartments 131, 132, 133 and 134. After a first delay, a shift register 140 is loaded in parallel, with the video bit signals $B_{I-2,J}$, $B_{I-1,J}$, $B_{I,J}$ and $B_{I+1,J}$ received, respectively, by compartments 141, 142, 143 and 144. After a second delay, a shift register 150 is loaded in parallel, with the video bit signals $B_{I-2,J+1}$, $B_{I-1,J+1}$, $B_{I,J+1}$, and $B_{I+1,J+1}$ received, respectively, by compartments 151, 152, 153 and 154. After a third delay, a shift register 160 is loaded in parallel, with the video bit signals $B_{I-2,J+2}$, $B_{I-1,J+2}$, $B_{I,J+2}$, and $B_{I+1,J+2}$ received, respectively, by compartments 161, 162, 163, and 164. As before, the contents of the shift registers are serially output, staggered in time, with the first output of the shift register 130 occuring first, and the first output of the shift register 160 occurring last. The delays 170, 171, and 172 synchronize, respectively, the outputs of the shift registers 130, 140, and 150 with the outputs of the shift register 160. In this fashion video bit signals having the same $x$ coordinate are aligned in time. Preferably, the delays 170, 171, and 172 each comprises a shift register. The outputs of the delay 170, the delay 171, the delay 172, and the shift register 160 are conveyed, respectively, to a series of delays 180, 181, and 182, a series of delays 184, 185 and 186, a series of delays 190, 191, and 192, and a series of delays 195, 196, and 197 which make all of the video bit signals simultaneously available for conveyance to the Boolean processor 44. Preferably each of the delays 180, 181, 182, 184, 185, 186, 190, 191, 192, 195, 196 and 197 comprises a standard D type flip-flop.

Figure 8:
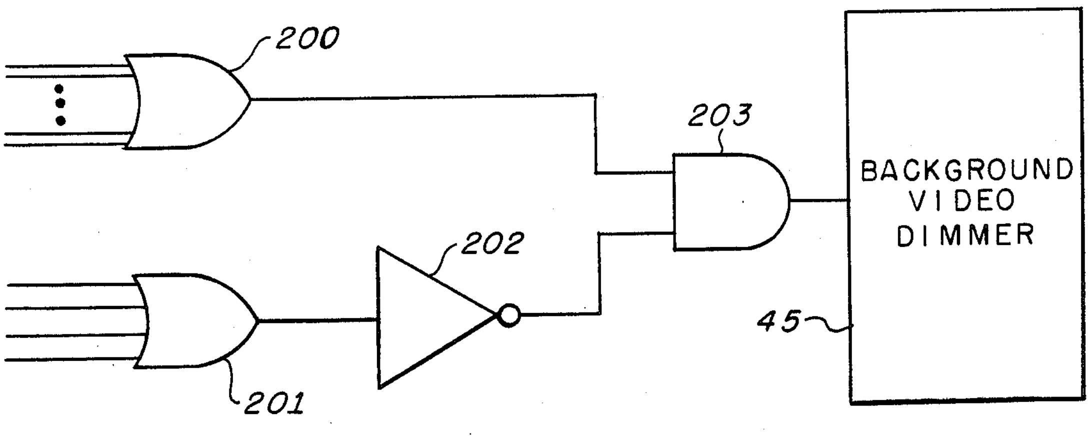
FIG. 8 is a schematic diagram, partially in block, of a Boolean processor and a background video dimmer utilized in a preferred embodiment of the invention.

Referring to FIG. 8, in a preferred embodiment of the invention the Boolean processor 44 for implementing the expression $$DS = \left(\sum_{X=I-2,Y=J-1}^{I+1,J+2} B_{X,Y}\right)\left(\overline{\sum_{X=I-1,Y=J}^{I,J+1} B_{X,Y}}\right)$$

comprises a sixteen input OR gate 200 which receives the sixteen video bit signals corresponding to the first summation sign in the expression for DS, and generates the Boolean OR sum signal thereof. A four input OR gate 201 receives the four video bit signals corresponding to the second summation sign in the expression for DS, and generates the Boolean OR sum signal thereof. The output of the OR gate 201 is received by a NOT gate 202 which generates the complement thereof. The output of the NOT gate 202 and the OR gate 200 are received by an AND gate 203 which generates the Boolean AND product signal thereform. The output of the AND gate 203 is conveyed to the background video dimmer 45.

As indicated above, this embodiment of the present invention is utilized in conjunction with the present assignee's second invention, Ser. No. 553,224, entitled, Apparatus for Expanding Illuminated Picture Elements in CRT Displays. Symbols are generated via the present assignee's second invention, and halos therearound are generated via the above preferred embodiment of the present invention. The Boolean OR sum signal $$\sum_{X=I-1, Y=J-1}^{I,J+1} B_{X,Y}$$

employed in the present assignee's second invention may be drawn from the output of the Boolean OR gate 201 in FIG. 8 of the present invention.

The components of the present invention are well-known in the art or readily contrived by one of ordinary skill therein. Referring to FIG. 3, the image memory 43, the coordinator 40, the background video generator 46, and the CRT display 41 are conventional, well-known apparatus. The background video dimmer 45, for conveying background video signals or altering them to diminish illumination intensity, is readily contrived by one of ordinary skill in the art. Other versions of the address readers described above, and other versions of the Boolean processors described above are also readily contrived by one of ordinary skill in the art.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. An apparatus for generating a halo about symbols in video displaying means, comprising:

means for displaying video data, comprising:

a matrix of picture elements, denoted $P_{X,Y}$; and means for illuminating said picture elements in response to applied signals;

means, coupled to said video displaying means, for generating coordinates, for providing signals representing said coordinates, and for synchronizing said illuminating means with said coordinates;

means for storing video bit signals, denoted $B_{X,Y}$, comprising addresses corresponding to said picture elements;

means, coupled to said storing means and said coordinate generating means, for reading, in response to a signal from said coordinate generating means representing a generated coordinate i,j, said addresses corresponding to picture elements $P_{I-1,J-1}$, $P_{I,J-1}$, $P_{I+1,J-1}$, $P_{I-1,J}$, $P_{I,J}$, $P_{I+1,J}$, $P_{I-1,J+1}$, $P_{I,J+1}$, and $P_{I+1,J+1}$;

means, coupled to said address reading means, for generating a digital signal $$\left( \sum_{X=I-1, Y=J-1}^{I+1, J+1} B_{X,Y} \right) (\overline{B_{I,J}});$$

means, coupled to said coordinate generating means, for generating, in response to a signal from said coordinate generating means representing said generated coordinate i, j, a video background signal for producing a predetermined intensity of illumination of said picture element $P_{I,J}$;

means, coupled to said video displaying means, said digital signal generating means, and said video background signal generating means, for generating, in response to a zero digital signal and said video background signal, a first signal, and for generating, in response to a one digital signal and said video background signal, a second signal, said picture element $P_{I,J}$, being illuminated at a predetermined fraction of said predetermined intensity by said illuminating means of said video displaying means, in response to said second signal, and said picture element $P_{I,J}$ being illuminated by said illuminating means at said predetermined intensity, in response to said first signal.

2. An apparatus as in claim 1 wherein said storing means comprises an image memory.

3. An apparatus as in claim 2 wherein said video displaying means comprises a CRT display.

4. An apparatus as in claim 3 wherein said predetermined fraction is substantially one-half.

5. An apparatus as in claim 4 wherein said address reading means comprises:

a first shift register comprising three compartments;

a second shift register comprising three compartments;

a third shift register comprising three compartments;

a first delay coupled to said first shift register;

a second delay coupled to said first delay;

a third delay coupled to said second delay;

a fourth delay coupled to said second shift register;

a fifth delay coupled to said fourth delay;

a sixth delay coupled to said fifth delay;

a seventh delay coupled to said third shift register; and an eighth delay coupled to said seventh delay.

6. An apparatus as in claim 5 wherein said digital signal generating means comprises:

a Boolean OR gate having nine input terminals;

a Boolean NOT gate; and a Boolean AND gate coupled to receive output signals from said Boolean OR gate and said Boolean NOT gate.

7. An apparatus as in claim 6 wherein said first delay comprises a shift register, and said fourth delay comprises a shift register.

8. An apparatus as in claim 7 wherein said second delay, said third delay, said fifth delay, said sixth delay, said seventh delay, and said eighth delays each comprises a D-type flip-flop.

9. An apparatus as in claim 1 wherein said predetermined fraction is substantially one-half.

10. An apparatus as in claim 9 wherein said address reading means comprises:

a first shift register comprising three compartments;

a second shift register comprising three compartments;

a third shift register comprising three compartments;
a first delay coupled to said first shift register;
a second delay coupled to said first delay;
a third delay coupled to said second delay;
a fourth delay coupled to said second shift register;
a fifth delay coupled to said fourth delay;
a sixth delay coupled to said fifth delay;
a seventh delay coupled to said third shift register; and
an eighth delay coupled to to said seventh delay.

11. An apparatus as in claim 10 wherein said first delay comprises a shift register, said fourth delay comprises a shift register, and said second, third, fifth, sixth, seventh and eighth delay each comprises a D-type flip-flop.

12. An apparatus for generating a halo about symbols produced by expanding illuminated picture elements in video displaying means, comprising:

means for displaying video data; comprising:
a matrix of picture elements, denoted $P_{X,Y}$; and
means for illuminating said picture elements in response to applied signals;
means, coupled to said video displaying means, for generating coordinates, for providing signals representing said coordinates, and for synchronizing said illuminating means with said coordinates;
means for storing video bit signals, denoted $B_{X,Y}$, comprising addresses corresponding to said picture elements, each of said addresses being identified by an X and a Y binary coordinate, said video bit signals being stored only in said addresses whose X coordinate has a predetermined first binary digit, and whose Y coordinate has a predetermined first binary digit;
means coupled to said storing means and said coordinate generating means, for reading, in response to a signal from said coordinate generating means representing a generated coordinate i,j, said addresses corresponding to picture elements $P_{I-2,J-1}$, $P_{I-1,J-1}$, $P_{I,J-1}$, $P_{I+1,J-1}$, $P_{I-2,J}$, $P_{I-1,J}$, $P_{I,J}$, $P_{I+1,J}$, $P_{I-2,J+1}$, $P_{I-1,J+1}$, $P_{I,J+1}$, $P_{I+1,J+1}$, $P_{I-2,J+2}$, $P_{I-1,J+2}$, $P_{I,J+2}$, $P_{I+1,J+2}$;
means, coupled to said address reading means, for generating a digital signal $$\left(\sum_{X=I-2,Y=J-1}^{I+1,J+2} B_{X,Y}\right)\left(\overline{\sum_{X=I-1,Y=J}^{I,J+1} B_{X,Y}}\right);$$

means, coupled to said coordinate generating means, forgenerating, in response to a signal from said coordinate generating means representing said generated coordinate i,j, a video background signal for producing a predetermined intensity of illumination of said picture element $P_{I,J}$;
means, coupled to said video displaying means, said digital signal generating means, and said video background signal generating means, for generating, in response to a zero digital signal and said video background signal, a first signal, and for generating, in response to a one digital signal and said video background signal, a second signal,
said picture element $P_{I,J}$, being illuminated at a predetermined fraction of said predetermined intensity by said illuminating means of said video displaying means, in response to said second signal, and said picture element $P_{I,J}$ being illuminated by said illuminating means at said predetermined intensity, in response to said first signal.

13. An apparatus as in claim 12 wherein said storing means comprises an image memory.

14. An apparatus as in claim 13 wherein said video displaying means comprises a CRT display.

15. An apparatus as in claim 14 wherein said predetermined fraction is substantially one-half.

16. An apparatus as in claim 15 wherein said address reading means comprises:

a first shift register comprising four compartments;
a first delay coupled to said first shift register;
a second delay coupled to said first delay;
a third delay coupled to said second delay;
a fourth delay coupled to said third delay;
a second shift register comprising four compartments;
a fifth delay coupled to said second shift register;
a sixth delay coupled to said fifth delay;
a seventh delay coupled to said sixth delay;
an eight delay coupled to said seventh delay;
a third shift register comprising four compartments;
a ninth delay coupled to said third shift register;
a tenth delay coupled to said ninth delay;
an eleventh delay coupled to said tenth delay;
a twelfth delay coupled to said eleventh delay;
a fourth shift register comprising four compartments;
a thirteenth delay coupled to said fourth shift register;
a fourteenth delay coupled to said thirteenth delay; and
a fifteenth delay coupled to said fourteenth delay.

17. An apparatus as in claim 16 wherein said digital signal generating means comprises:

a first Boolean OR gate having 16 input terminals;
a second Boolean OR gate having 4 input terminals;
a Boolean NOT gate, coupled to receive an output signal from said second Boolean OR gate; and
a Boolean AND gate, coupled to receive an output signal from said Boolean NOT gate and said first Boolean OR gate.

18. An apparatus as in claim 17 wherein said first delay, said fifth delay, and said ninth delay each comprises a shift register.

19. An apparatus as in claim 18 wherein said second delay, said third delay, said fourth delay, said sixth delay, said seventh delay, said eighth delay, said tenth delay, said eleventh delay, said twelfth delay, said thirteenth delay, said fourteenth delay, and said fifteenth delay each comprises a D-type flip-flop.

20. An apparatus as in claim 12 wherein said predetermined fraction is substantially one-half.

21. An apparatus as in claim 20 wherein said address reading means comprises:

a first shift register comprising four compartments;
a first delay coupled to said first shift register;
a second delay coupled to said first delay;
a third delay coupled to said second delay;
a fourth delay coupled to said third delay;
a second shift register comprising four compartments;
a fifth delay coupled to said second shift register;
a sixth delay coupled to said fifth delay;
a seventh delay coupled to said sixth delay;
an eighth delay coupled to said seventh delay;
a third shift register comprising four compartments;
a ninth delay coupled to said third shift register;
a tenth delay coupled to said ninth delay;
an eleventh delay coupled to said tenth delay;
a twelfth delay coupled to said eleventh delay;
a fourth shift register comprising four compartments;

a thirteenth delay coupled to said fourth shift register;

a fourteenth delay coupled to said thirteenth delay; and a fifteenth delay coupled to said fourteenth delay.

22. An apparatus as in claim 21 wherein said first, fifth, and ninth delays each comprises a shift register, and said second, third, fourth, sixth, seventh, eighth, tenth, eleventh, twelfth, thirteenth, fourteenth, and fifteenth delays each comprises a D-type flip-flop.

* * * * *